United States Patent
Vasseur et al.

(10) Patent No.: US 8,363,571 B2
(45) Date of Patent: *Jan. 29, 2013

(54) DYNAMICALLY AND EFFICIENTLY FORMING HIERARCHICAL TUNNELS

(75) Inventors: Jean-Philippe Vasseur, Saint Martin dUriage (FR); Carol Iturralde, Framingham, MA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/433,011

(22) Filed: Mar. 28, 2012

(65) Prior Publication Data

US 2012/0183000 A1 Jul. 19, 2012

Related U.S. Application Data

(63) Continuation of application No. 11/589,600, filed on Oct. 30, 2006, now Pat. No. 8,199,642.

(60) Provisional application No. 60/844,470, filed on Sep. 14, 2006.

(51) Int. Cl.
*H04L 12/28* (2006.01)
*H04L 12/26* (2006.01)
*H04L 12/56* (2006.01)
*G08C 15/00* (2006.01)
*H04J 3/14* (2006.01)
*G06F 15/16* (2006.01)

(52) U.S. Cl. .......... 370/255; 370/230; 370/392; 709/228

(58) Field of Classification Search ................ None
See application file for complete search history.

(56) References Cited

U.S. PATENT DOCUMENTS

| | | | |
|---|---|---|---|
| 6,463,470 B1 | 10/2002 | Mohaban et al. | |
| 6,473,421 B1 | 10/2002 | Tappan | |
| 6,519,254 B1 | 2/2003 | Chuah et al. | |
| 6,856,991 B1 | 2/2005 | Srivastava | |
| 7,031,328 B2 | 4/2006 | Thubert et al. | |
| 7,042,838 B1 | 5/2006 | Shand et al. | |
| 7,107,613 B1 | 9/2006 | Chen et al. | |
| 7,120,151 B1 | 10/2006 | Ginjpalli et al. | |
| 7,133,415 B2 | 11/2006 | Zelig et al. | |
| 2003/0076825 A1 | 4/2003 | Guruprasad | |
| 2004/0017796 A1 | 1/2004 | Lemieux et al. | |
| 2004/0170125 A1* | 9/2004 | O'Neill | 370/230 |
| 2005/0141427 A1 | 6/2005 | Bartky | |
| 2005/0220014 A1* | 10/2005 | DelRegno et al. | 370/230 |
| 2006/0274700 A1* | 12/2006 | Janneteau et al. | 370/338 |

OTHER PUBLICATIONS

Awduche, et al., "RSVP-TE: Extensions to RSVP for LSP Tunnels", Network Working Group, Request for Comments 3209, Dec. 2001, pp. 1-57, IETF.

Smit, et al., "Intermediate System to Intermediate System (IS-IS) Extensions for Traffic Engineering (TE)", Network Working Group, Request for Comments 3784, Jun. 2004, pp. 1-13, IETF.

(Continued)

*Primary Examiner* — Andrew Chriss
(74) *Attorney, Agent, or Firm* — Cesari & McKenna, LLP

(57) ABSTRACT

In one embodiment, a hierarchical tunnel that encapsulates a plurality of child tunnels along a shared path segment is used. The shared path segment extends from a head-end node across one or more intermediate nodes to a tail-end node. A state of a child tunnel of the plurality of child tunnels encapsulated within the hierarchical tunnel is refreshed by the head-end node sending one or more refresh messages along the child tunnel that include a request that the one or more intermediate nodes remove the state of the child tunnel without sending error messages, and sending one or more encapsulated refresh messages within the hierarchical tunnel that cause the tail-end node to continue propagation of refresh messages along the child tunnel.

20 Claims, 8 Drawing Sheets

OTHER PUBLICATIONS

Katz, et al., "Traffic Engineering (TE) Extensions to OSPF Version 2", Network Working Group, Request for Comments 3630, Sep. 2003, pp. 1-14, IETF.

Braden, et al., "Resource ReSerVation Protocol (RSVP)—Version 1 Functional Specification", Network Working Group, Request for Comments 2205, Sep. 1997, pp. 1-105, IETF.

Vasseur, et al., "Path Computation Element (PCE) Communication Protocol (PCEP)—Version 1 (draft-ietf-pce-pcep-03.txt)" Network Working Group, Internet Draft, Oct. 18, 2006, pp. 1-61, IETF.

Berger, L., "Generalized Multi-Protocol Label Switching (GMPLS) Signaling Resource ReSerVation Protocol-Traffic Engineering (RSVP-TE) Extensions", Network Working Group, Request for Comments 3473, Jan. 2003, pp. 1-40, IETF.

Farrel, et al., "Encoding of Attributes for Multiprotocol Label Switching (MPLS) Label Switched Path (LSP) Establishment Using Resource ReSerVation Protocol-Traffic Engineering (RSVP-TE)", Network Working Group, Request for Comments 4420, Feb. 2006, pp. 1-20, IETF.

Mannie, E., "Generalized Multi-Protocol Label Switching (GMPLS) Architecture", Network Working Group, Request for Comments 3945, Oct. 2004, pp. 1-65, IETF.

Mannie, et al., "Generalized Multi-Protocol Label Switching (GMPLS) Extensions for Synchronous Optical Network (SONET) and Synchronous Digital Hierarchy (SDH) Control", Network Working Group, Request for Comments 3946, Oct. 2004, pp. 1-25, IETF.

Baker, et al., "Aggregation of RSVP for IPv4 and IPv6 Reservations", Network Working Group, Request for Comments 3175, Sep. 2001, pp. 1-34, IETF.

Le Faucheur, et al., "Aggregation of RSVP Reservations over MPLS TE/DS-TE Tunnels (draft-ietf-tsvwg-rsvp-dste-01.txt)", Internet Draft, Feb. 2006, pp. 1-28, IETF.

* cited by examiner

| cLSP 405 | ERO 410 | ATTRIBUTES 415 | BANDWIDTH 420 |
|---|---|---|---|
| 1 | ERO 1 | AG-X | BW 1 |
| 2 | ERO 2 | AG-X | BW 2 |
| 3 | ERO 3 | AG-X | BW 3 |
| 4 | ERO 4 | AG-Y | BW 4 |
| 5 | ERO 5 | AG-Y | BW 5 |
| 6 | ERO 6 | AG-Z | BW 6 |
| ... | ... | ... | ... |

TABLE 400

ENTRIES 450

FIG. 4

DYNAMICALLY AND EFFICIENTLY FORMING HIERARCHICAL TUNNELS

CROSS-REFERENCE TO RELATED APPLICATION

The present application is a continuation of U.S. patent application Ser. No. 11/589,600, which was filed on Oct. 30, 2006, by Vasseur et al. for DYNAMICALLY AND EFFICIENTLY FORMING HIERARCHICAL TUNNELS and which is hereby incorporated by reference. U.S. patent application Ser. No. 11/589,600 claims the benefit of U.S. Provisional Patent Application Ser. No. 60/844,470, which was filed on Sep. 14, 2006, by Vasseur et al. for DYNAMICALLY AND EFFICIENTLY FORMING HIERARCHICAL TUNNELS and is also hereby incorporated by reference.

TECHNICAL FIELD

The present disclosure relates generally to computer networks, and, more particularly, to forming hierarchical tunnels within the computer networks.

BACKGROUND

Hierarchical tunnels, e.g., label switched paths (LSPs), have been used to improve the scalability of tunneling networks, for example Multi-Protocol Label Switching (MPLS) Traffic Engineering (TE) networks. For instance, as the number of nodes and tunnels increases within the network, signaling burdens (tunnel set up/reroute/tear down/resize), resource consumption (e.g., memory), and state maintenance (e.g., refresh, etc.) become increasingly complex and taxing, particularly within network cores. The use of hierarchical tunnels, however, allows for a plurality of tunnels (child tunnels, or "cLSPs") that traverse a shared path segment (e.g., and have the same or compatible attributes/affinities) to be further encapsulated onto a single hierarchical tunnel (parent tunnel or "hLSP"), which may be less complex and less burdensome to maintain than the plurality of child tunnels.

While hierarchical tunnels offer various benefits that will be understood by those skilled in the art, various technical challenges are also presented with their use. For instance, where a full mesh of hierarchical tunnels is impractical (e.g., where requiring different tunnels for different attributes/affinities multiplies the number of tunnels correspondingly), determining the location of the hierarchical tunnels (e.g., end nodes and a path) and sets of child tunnels to encapsulate/aggregate within hierarchical tunnels can be particularly difficult and inefficient. Currently, hierarchical tunnels may be established (e.g., manually) a priori using estimates of child tunnel locations and needs, but child tunnels may be dynamically created, destroyed, moved, changed, etc. as time progresses, potentially in a way that obsoletes the a priori establishments.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 4 illustrates a schematic block diagram of a table;

DESCRIPTION OF EXAMPLE EMBODIMENTS

Overview

Figure 1:
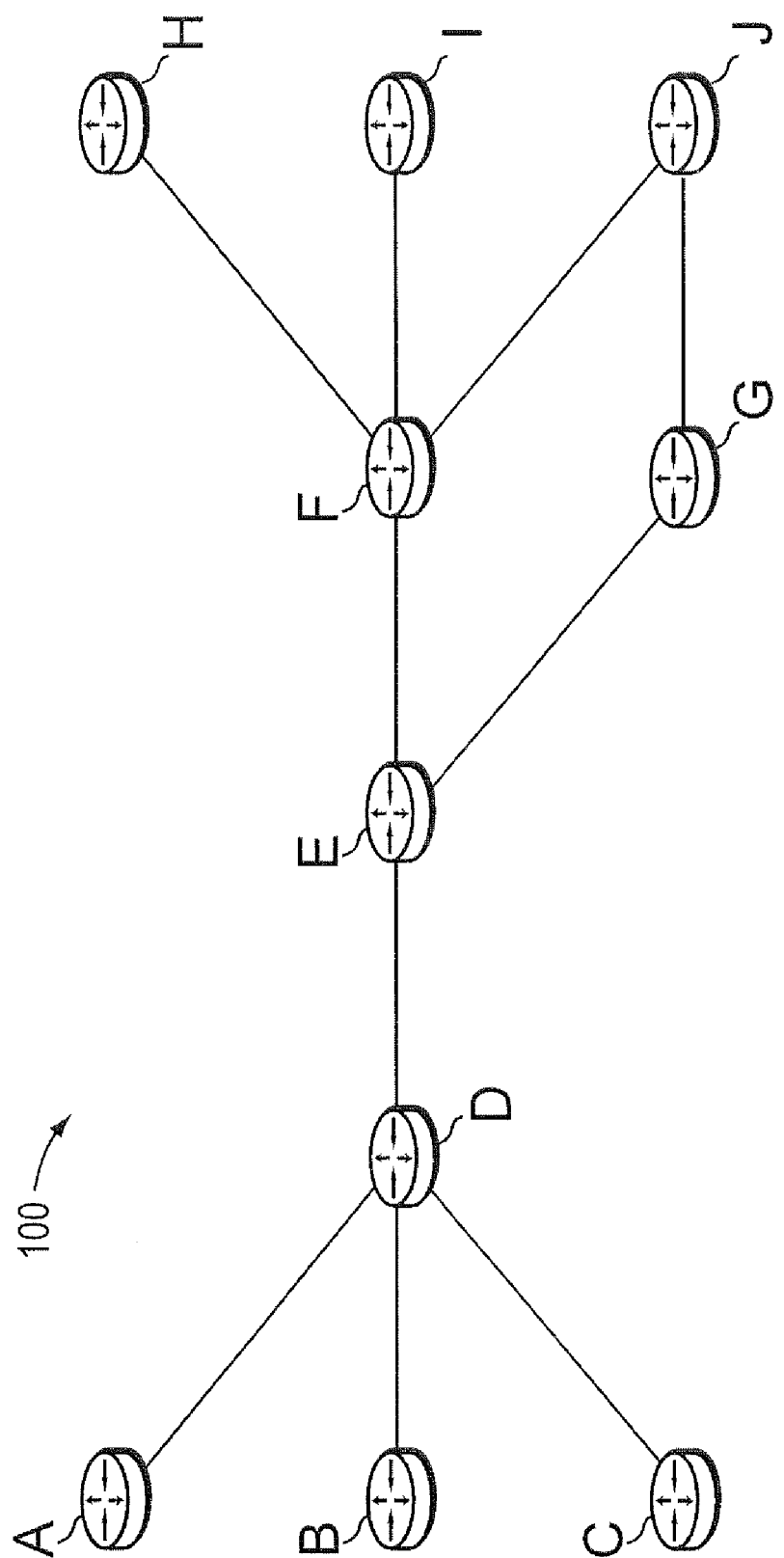
FIG. 1 illustrates a schematic block diagram of an example computer network.

According to embodiments of the disclosure, a node (e.g., a grooming node) determines a set of attribute groups (AGs) of existing child tunnels through the network, where an AG is a group of one or more compatible attributes among child tunnels, e.g., excluding bandwidth. The grooming node also determines a set of corresponding child tunnels that belong to a particular AG and that follow a shared path segment through the network, and may establish an hierarchical tunnel that encapsulates the set of corresponding child tunnels along the shared path segment (e.g., thus reducing the number of child tunnels in portions of the network).

Also according to embodiments of the disclosure, a head-end node establishes an hierarchical tunnel to a tail-end node that traverses one or more intermediate nodes through the network. The head-end node refreshes a state of a child tunnel encapsulated within the hierarchical tunnel with i) a refresh message sent along the child tunnel having a field requesting that the one or more intermediate nodes each remove the state of the child tunnel without sending any error messages, and ii) one or more refresh messages encapsulated within the hierarchical tunnel in a manner that allows the tail-end node to continue any necessary propagation of refresh messages along the child tunnel.

DESCRIPTION

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain," and a router that interconnects different domains is generally referred to as a "border router."

FIG. 1 is a schematic block diagram of an exemplary computer network 100 illustratively comprising nodes (e.g., routers) A-J interconnected by links as shown. Those skilled in the art will understand that any number of nodes, routers, links, etc. may be used in the computer network, and that the view shown herein is for simplicity. Those skilled in the art will also understand that while the present invention is described generally, it may apply to provider core network with provider (P) and provider edge (PE) routers, any network configuration within an AS or area, or throughout multiple ASes or areas, etc.

Data packets may be exchanged among the nodes of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
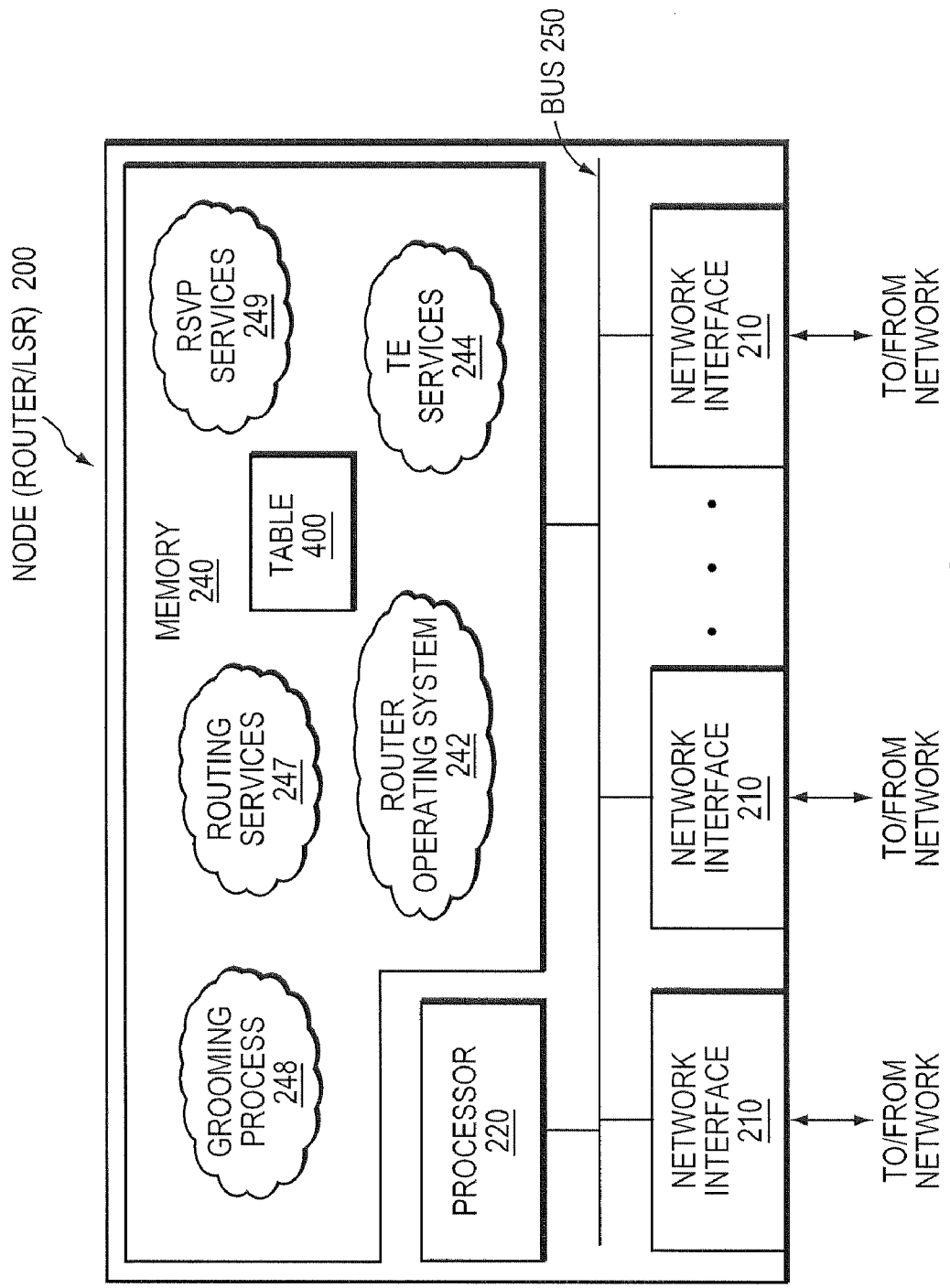
FIG. 2 illustrates a schematic block diagram of an example network device/router.

FIG. 2 is a schematic block diagram of an exemplary node/router 200 that may be advantageously used with one or more embodiments described herein, e.g., as a head-end node (label switched router, "LSR"). The node comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as Table 400. An operating system 242 (e.g., the Internetworking Operating System, or IOS™, of Cisco Systems, Inc.), portions of which are typically resident in memory 240 and executed by the processor, functionally organizes the node by, inter alia, invoking network operations in support of software processes and/or services executing on the router.

These software processes and/or services may comprise routing services 247, Resource ReSerVation Protocol (RSVP) services 249, Traffic Engineering (TE) services 244, and an example Grooming process/services 248 described herein. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database (not shown) containing, e.g., data used to make forwarding decisions. In particular, changes in the network topology may be communicated among routers 200 using IGP services, such as the conventional OSPF and IS-IS link-state protocols. Suppose, for example, that a communication link fails or a cost value associated with a network node changes. Once the change in the network's state is detected by one of the routers, that router may flood an IGP advertisement/message communicating the change to the other routers in the network. In this manner, each of the routers eventually "converges" to an identical view of the network topology. Notably, routing services 247 may also perform functions related to virtual routing protocols, such as maintaining VRF instances (not shown) as will be understood by those skilled in the art.

Multi-Protocol Label Switching (MPLS) Traffic Engineering has been developed to meet data networking requirements such as guaranteed available bandwidth or fast restoration. MPLS Traffic Engineering exploits modern label switching techniques to build end-to-end tunnels based on a series of constraints through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Establishment of an MPLS TE-LSP from a head-end LSR to a tail-end LSR involves computation of a path through a network of LSRs. Optimally, the computed path is the "shortest" path, as measured in some metric, that satisfies all relevant LSP Traffic Engineering constraints or "attributes," such as e.g., required bandwidth, "affinities" (administrative constraints to avoid or include certain links), priority, class type, etc. Path computation can either be performed by the head-end LSR or by some other entity operating as a path computation element (PCE) not co-located on the head-end LSR. The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE-LSPs can be configured within a single domain, e.g., area, level, or AS, or may also span multiple domains, e.g., areas, levels, or ASes.

The PCE is an entity having the capability to compute paths between any nodes of which the PCE is aware in an AS or area. PCEs are especially useful in that they are more cognizant of network traffic and path selection within their AS or area, and thus may be used for more optimal path computation. A head-end LSR may further operate as a path computation client (PCC) configured to send a path computation request to the PCE, and receive a response with the computed path, which potentially takes into consideration other path computation requests from other PCCs. It is important to note that when one PCE sends a request to another PCE, it acts as a PCC. A PCC can be informed of a PCE either by pre-configuration by an administrator, or by a PCE Discovery (PCED) message ("advertisement"), which is sent from the PCE within its area or level or across the entire AS to advertise its services.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205, the contents of which are hereby incorporated by reference in their entirety. In the case of traffic engineering applications, RSVP signaling is used to establish a TE-LSP and to convey various TE-LSP attributes to routers, such as border routers, along the TE-LSP obeying the set of required constraints whose path may have been computed by various means.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, inter alia, the Layer Two Tunnel Protocol (L2TP), the Point-to-Point Tunneling Protocol (PPTP), and IP tunnels.

A common practice in TE-enabled networks consists of deploying a mesh of TE-LSPs between a plurality of edge devices (provider edge, or PE routers) through a core network of fewer (generally large capacity) routers (provider, or P routers). In a mesh between PE routers (e.g., a "full mesh"), each PE router on one side of the core is connected to each PE router on the other side of the core via one or more TE-LSPs. The mesh of TE-LSPs provides various benefits within the network, as known to those skilled in the art, such as for providing redundancy to nodes connected to more than one PE router.

In one embodiment, the routers described herein are IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress, a forwarding decision is made based on the incoming label but optionally no label is included when the packet is sent on to the next hop.

The paths taken by packets that traverse the network in this manner are referred to as label switched paths (LSPs) or Traffic Engineering (TE)-LSPs. Establishment of a TE-LSP requires computation of a path, signaling along the path, and modification of forwarding tables along the path. MPLS TE establishes LSPs that have guaranteed bandwidth under certain conditions. Illustratively, the TE-LSPs may be signaled through the use of the RSVP protocol (with Traffic Engineering extensions), and in particular, RSVP TE signaling messages. Notably, when incorporating the use of PCEs, the path computation request (and response) between PCC and PCE can be exchanged in accordance with a protocol specified in Vasseur, et al., *Path Computation Element (PCE) Communication Protocol (PCEP)—Version 1*—<draft-ietf-pce-pcep-03.txt>, Internet Draft, October 2006, the contents of which are hereby incorporated by reference in its entirety. It should be understood that the use of RSVP or PCEP serves only as an example, and that other communication protocols may be used in accordance with the present invention.

RSVP services 249 contain computer executable instructions for implementing RSVP and processing RSVP messages in accordance with the present invention. RSVP is described in RFC 2205, entitled *Resource ReSerVation Protocol (RSVP)*, and in RFC 3209, entitled *RSVP-TE: Extensions to RSVP for LSP Tunnels*, both as incorporated above.

TE services 244 contain computer executable instructions for implementing TE functions in accordance with the present invention. Examples of Traffic Engineering are described in RFC 3209, RFC 3784, and RFC 3630 as incorporated above, and in RFC 3473, entitled, *Generalized Multi-Protocol Label Switching (GMPLS) Signaling Resource ReSerVation Protocol-Traffic Engineering (RSVP-TE) Extensions* dated January 2003, which is hereby incorporated by reference in its entirety. A TE database (TED, not shown) may be illustratively resident in memory 240 and used to store TE information provided by the routing protocols, such as IGP, BGP, and/or RSVP (e.g., with TE extensions as described herein). The TED may be illustratively maintained and managed by TE services 244.

In accordance with RSVP, to request a data flow (TE-LSP) between a sender (head-end node) and a receiver (tail-end node), the sender may send an RSVP path request (Path) message downstream to the receiver along a path (e.g., a unicast route) to identify the sender and indicate e.g., bandwidth needed to accommodate the data flow, along with other attributes of the TE-LSP. The Path message may contain various information about the data flow including, e.g., traffic characteristics of the data flow, as well as an explicit route object (ERO), indicating a hop-by-hop path over which the message should traverse (or, notably, loose hops, etc., as will be understood by those skilled in the art). Also in accordance with RSVP, a receiver establishes the TE-LSP between the sender and receiver by responding to the sender's Path message with a reservation request (Resv) message. The reservation request message travels upstream hop-by-hop along the flow from the receiver to the sender. The reservation request message contains information that is used by intermediate nodes along the flow to reserve resources for the data flow between the sender and the receiver, to confirm the attributes of the TE-LSP, and provide a TE-LSP label. If an intermediate node in the path between the sender and receiver acquires a Path message or Resv message for a new or established reservation (TE-LSP) and encounters an error (e.g., insufficient resources, failed network element, etc.), the intermediate node generates and forwards a path or reservation error (PathErr or ResvErr, hereinafter Error) message to the sender or receiver, respectively.

Figure 3:
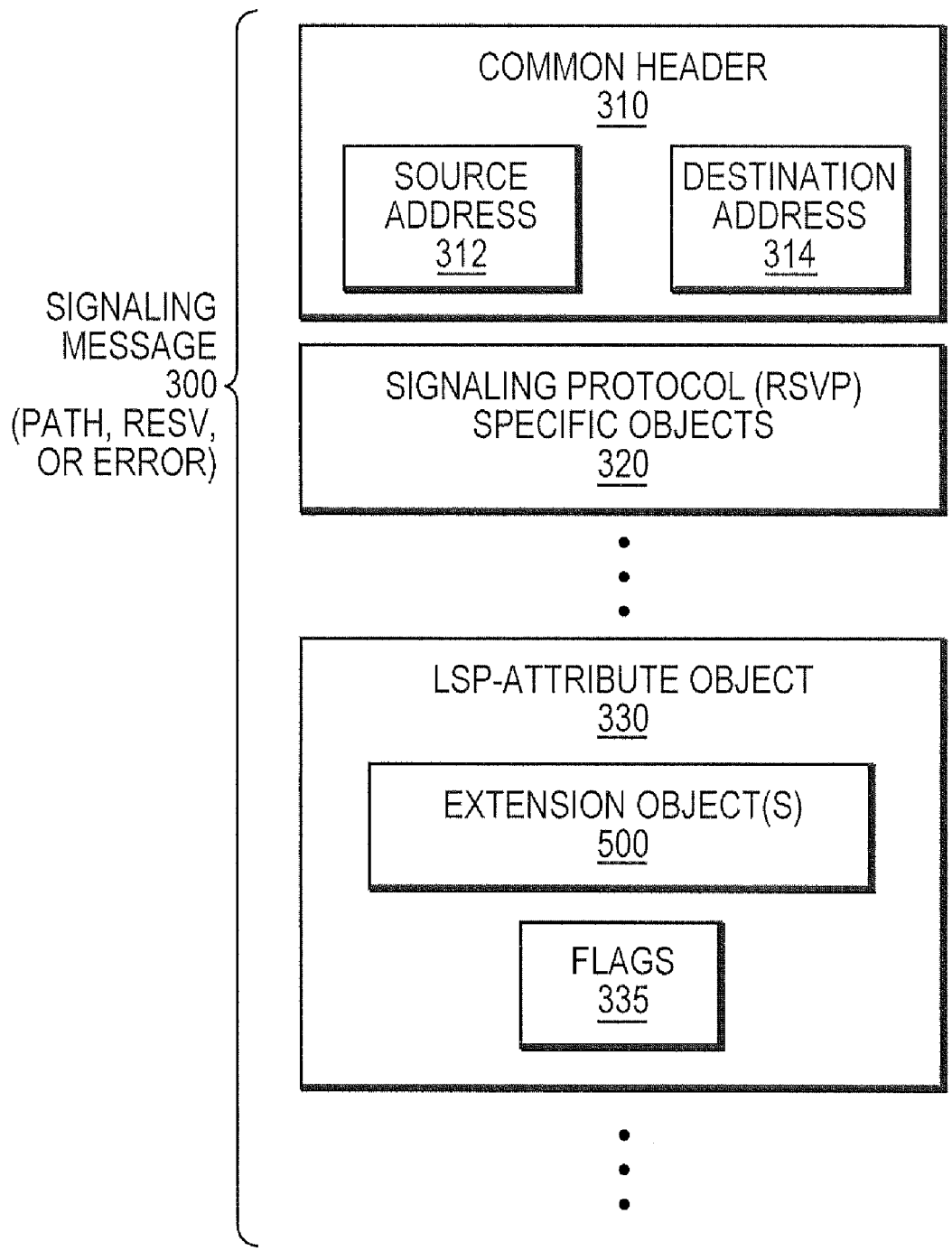
FIG. 3 illustrates a schematic block diagram of portions of a signaling message.

FIG. 3 is a schematic block diagram of portions of a signaling message 300 (e.g., RSVP message, such as Path, Resv, or Error) that may be advantageously used with the present invention. Message 300 contains, inter alia, a common header 310 and one or more signaling protocol specific objects 320, such as an LSP-ATTRIBUTE object 330 and any extension objects 500, as described herein. The common header 310 may comprise a source address 312 and destination address 314, denoting the origination and requested termination of the message 300. Protocol specific objects 320 contain objects necessary for each type of message 300 (e.g., Path, Resv, Error, etc.). For instance, a Path message may have a sender template object, Tspec object, Previous-hop object, ERO, etc. The LSP-ATTRIBUTE object 330, for instance, may be used to signal attributes and/or information regarding an LSP (tunnel). To communicate this information, LSP-ATTRIBUTE object 330 (as well as specific objects 320) may include various type/length/value (TLV) encoding formats and/or flags, as will be understood by those skilled in the art. An example of an LSP-ATTRIBUTE object is further described in RFC 4420, entitled *Encoding of Attributes for Multiprotocol Label Switching (MPLS) Label Switched Path (LSP) Establishment Using Resource ReserVation Protocol-Traffic Engineering (RSVP-TE)* dated February 2006, which is hereby incorporated by reference as though fully set forth herein. A Resv message, on the other hand, may have specific objects 320 for a label object, session object, filter spec object, etc., in addition to the LSP-ATTRIBUTE object 330. Error messages 300 (e.g., PathErr or ResvErr), may also have specific objects 320, such as for defining the type of error, etc.

It should be noted that in accordance with RSVP signaling, the state of the TE-LSP is refreshed on a timed interval, e.g., every thirty seconds, in which RSVP Path and Resv messages are exchanged. This timed interval is configurable by a system administrator. Moreover, various methods understood by those skilled in the art may be utilized to protect against route record objects (RROs) contained in signaling messages for a TE-LSP in the event security/privacy is desired. Such RRO filtering prevents a head-end node of the TE-LSP from learning of the nodes along the TE-LSP, i.e., nodes within the provider network.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled Generalized Multi-*Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

The present disclosure is directed to dynamically and efficiently forming hierarchical tunnels in a computer network. Assume, for example, that a full mesh of tunnels (e.g., TE-LSPs) exist between routers A, B, C, and H, I, J, as will be understood by those skilled in the art. According to one embodiment of the disclosure, a node (e.g., a "grooming node," router D) determines a set of attribute groups (AGs) of existing child tunnels through the network, where an AG is a group of compatible attributes among child tunnels, excluding bandwidth. For example, FIG. 4 illustrates a schematic block diagram of a data structure, such as a table, that shows example child tunnels (cLSPs) that may traverse the network (e.g., including router D). Table 400 is illustratively stored in memory 240 and includes one or more entries 450, each comprising a plurality of fields for storing a cLSP ID 405, an ERO 410, and attributes 415, which may also include a bandwidth (BW) value 420, as shown. The table 400 may be illustratively maintained and managed by TE services 244 and/or grooming process/services 248. Illustratively, it can be seen that AGs X, Y, and Z exist within the network (e.g., groups of attributes that share the same affinity, priority, class type, etc.). For a simple example, AG-X may comprise a priority value of "1", AG-Y a priority of "2", and AG-Z a priority of "3", as will be understood by those skilled in the art. (Illustratively, the shorthand representation of attribute groups, e.g., AG-X, AG-Y, and AG-Z, is used to indicate a certain set of is compatible attributes that is "shared" among cLSPs of that AG. For example, cLSPs 1-3 may each have a priority value of "1", as each shares AG-X.) The AGs are determined because any hierarchical tunnel has compatible attributes with the child tunnels it encapsulates (e.g., the same affinity, priority, class type, etc.).

Figure 5:
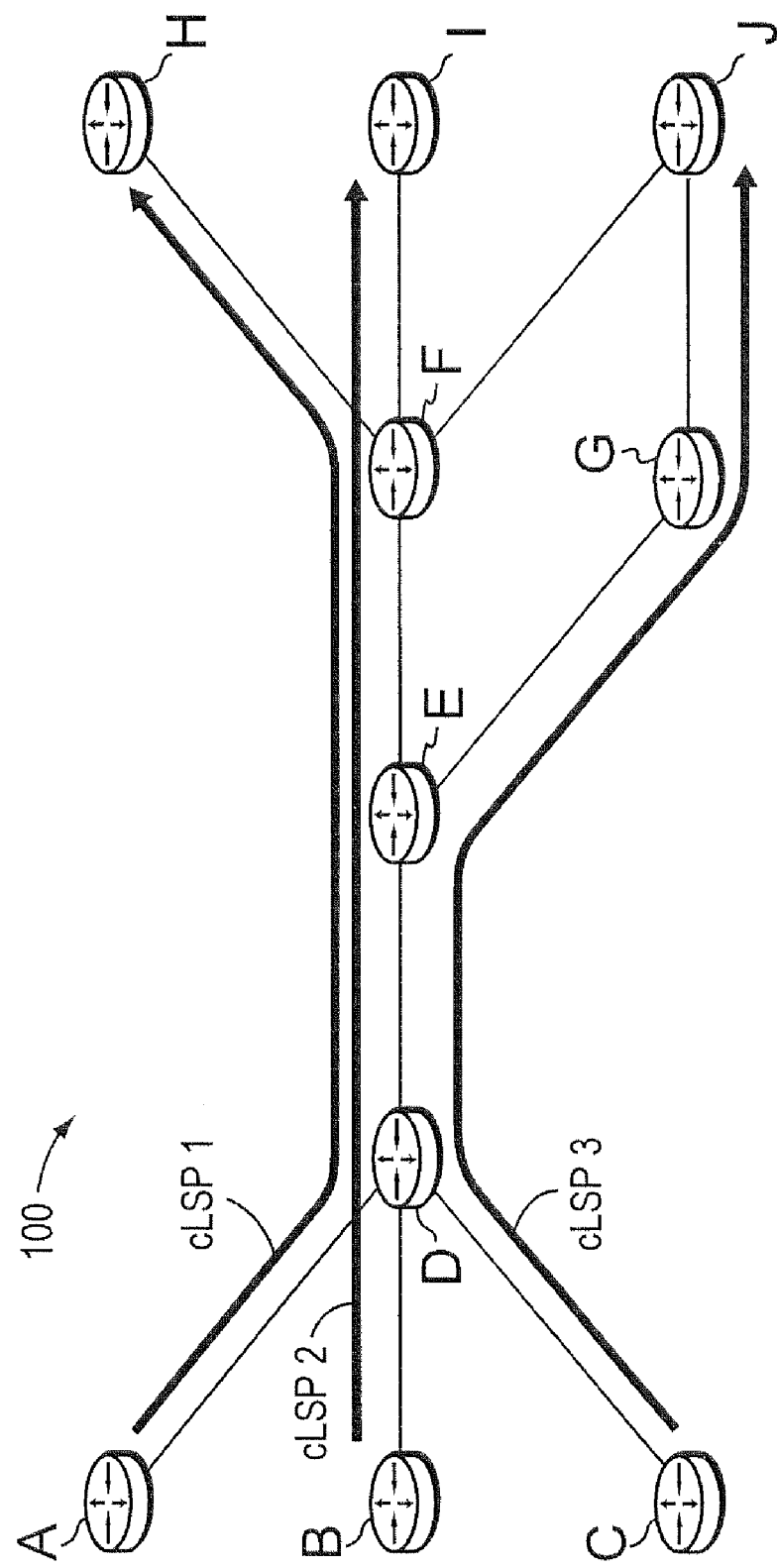
FIG. 5 illustrates a schematic block diagram of example child tunnels in the example network of FIG. 1.

Once the AGs are determined, the grooming node also determines a set of corresponding child tunnels that belong to a particular AG (or that would be compatible with the AG) and that follow a shared path segment through the network. For instance, cLSPs 1-3 each share the AG-X, as shown in FIG. 4. FIG. 5 illustrates a schematic block diagram of example child tunnels in the example network of FIG. 1. For simplicity, while a full mesh of child tunnels is described above, example child tunnels cLSPs 1-3 are shown illustrating a set of child tunnels that share an AG (AG-X). Notably, however, cLSP 3 traverses path segment D-E-G-J of the network 100, not segment D-E-F-J. Therefore, child tunnels cLSP 1-2 may be considered to have shared path segment D-E-F, while cLSPs 1-3 have shared path segment D-E only.

Once the set of child tunnels has been determined to belong to a particular AG, the grooming node may establish an hierarchical tunnel that encapsulates the set of corresponding child tunnels along the shared path segment (i.e., thus "grooming" the child tunnels into an hierarchical tunnel). An hierarchical tunnel may be generally defined as a tunnel that encapsulates another tunnel (e.g., by pushing another label in front of the child tunnel's label). As such, the intermediate nodes of the hierarchical tunnel are unaware of whether the traffic sent over the hierarchical tunnel belongs to an encapsulated child tunnel therein. Notably, RFC 3175 entitled *Aggregation of RSVP for IPv4 and IPv6 Reservations*, and the Internet Draft entitled *Aggregation of RSVP Reservations over MPLS TE/DS-TE Tunnels* <draft-ietf-tsvwg-rsvp-dste-01.txt>, may both further describe hierarchical tunneling (RSVP aggregation), and the contents of both are hereby incorporated by reference in their entirety.

Figure 6:
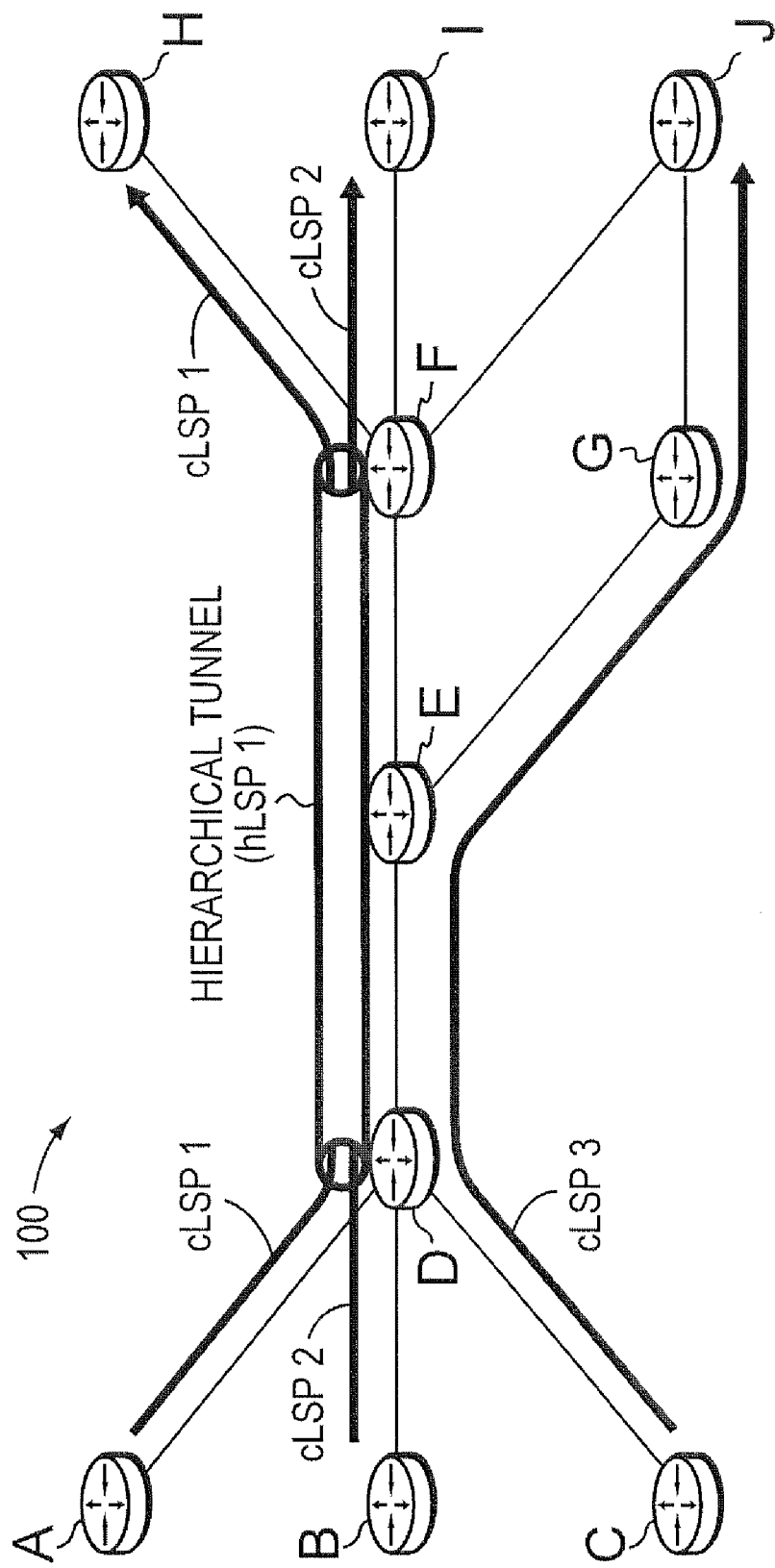
FIG. 6 illustrates a schematic block diagram of an example hierarchical tunnel for the example child tunnels of FIG. 5.

FIG. 6 illustrates a schematic block diagram of an example hierarchical tunnel (hLSP 1) for the example child tunnels of FIG. 5. Notably, while cLSPs 1-3 are shown sharing AG-X and having certain shared segments (ERO portions) the grooming node may determine whether the length (e.g., hops) of the hierarchical tunnel is to be greater than a configurable length threshold. The length threshold may be used to determine whether a sufficient length of the network (e.g., number of nodes) over which the child tunnels will be encapsulated/ aggregated merit creation of an hierarchical tunnel, and if so, the tunnel may be established in response. In other words, the grooming node may determine that shared segment D-E is too short for an hierarchical tunnel, but that D-E-F is long enough. Hence, cLSP 3 may not be aggregated onto the same hierarchical tunnel hLSP 1 as cLSPs 1-2 as shown.

Optionally, the grooming node (e.g., the head-end node of the hierarchical tunnel) may also determine whether the number of child tunnels sharing a particular AG is greater than a configurable number threshold. The number threshold may be used to determine whether a sufficient number of child tunnels will be aggregated to merit creation of an hierarchical tunnel, and if so, the tunnel may be established in response. For example, aggregating two child tunnels (e.g., cLSP 1-2) may merit hierarchical tunnel establishment, while one child tunnel (e.g., cLSP 3) may not. Those skilled in the art will understand that thresholds used herein are merely illustrative examples, and that any values may be used in accordance with one or more of the embodiments described herein.

The hierarchical tunnel may be established with attributes corresponding to the appropriate AG (e.g., AG-X), and may also have an appropriate bandwidth. The appropriate bandwidth may be determined as the total of the bandwidths of the aggregated child tunnels, or as the total multiplied by an over/under booking factor. An under booking factor, for example, may be used to take into account the prediction that not all child tunnels will utilize their fully-reserved bandwidth at the same time, etc. (e.g., such as taking into account the statistical multiplexing gain based on the number of groomed child tunnels). Over booking, on the other hand, may be used, for example, to be able to add more child tunnels in the future without having to resize the hierarchical tunnel.

Notably, certain nodes within the network may be designated as grooming capable nodes (e.g., based on policy), which may either be the head-end of an hierarchical tunnel, or another node (e.g., a PCE) capable of performing the determinations and establishments necessary. Moreover, the hierarchical tunnel may be treated similarly to a conventional tunnel, in that it may be updated/adjusted based on changing needs of the network (e.g., of the child tunnels). For instance, child tunnels may be added or removed from the hierarchical tunnel, and the hierarchical tunnel may be dynamically adjusted accordingly. Further, in the event a child tunnel is not to be encapsulated/aggregated into an hierarchical tunnel (e.g., based on a child tunnel head-end determination/policy), an additional LSP attribute (e.g., within LSP-ATTRIBUTE field 330) may be added to indicate as such.

While traffic originally from a child tunnel is encapsulated onto an hierarchical tunnel, the signaling/refresh messages (e.g., Path/Resv/etc.) of the child tunnel may (but need not) also be encapsulated and sent over the hierarchical tunnel. In this case, states of the child tunnel at intermediate nodes of the hierarchical tunnel would time-out, and the intermediate nodes would tear down the child tunnel under the assumption that is has failed or is otherwise no longer operational, such as by sending error messages (PathErr or Error 300) toward the tail-end node of the child tunnel.

According to another embodiment of the disclosure, a head-end node (e.g., router D) establishes an hierarchical tunnel (e.g., hLSP 1) to a tail-end node (e.g., router F) that traverses one or more intermediate nodes (e.g., router E) through the network 100, such as described above. To alleviate the problem mentioned above, the head-end node refreshes a state of each child tunnel (e.g., cLSP 1) encapsulated within the hierarchical tunnel with i) a refresh (e.g., Path) message 300 sent along the child tunnel having a field requesting that the one or more intermediate nodes each remove the state of the child tunnel without sending any error messages, and ii) one or more refresh messages encapsulated within the hierarchical tunnel in a manner that allows the tail-end node to continue any necessary propagation of refresh messages along the child tunnel.

The field used to request that the one or more intermediate nodes each remove the state of the child tunnel without sending any error messages may be embodied as an extension object field 500 in the Path message 300, such as a novel "GROOM-OP" field/object. By removing the state of the child tunnel on the intermediate nodes of the hierarchical tunnel, resources (e.g., bandwidth) within the network are freed, and the intermediate nodes need not expect nor require a refresh message 300 for that child tunnel. For instance, assuming a 10 kb/s reserved child tunnel, the hierarchical tunnel would have considered this bandwidth in its establishment (as described above), so maintaining the reservation on the intermediate nodes is an unnecessary double-booking of resources. Also, by specifically requesting that no error messages (e.g., PathErr or PathTear, etc.) be sent, the remainder of the respective child tunnels remain active through the refresh messages sent within the hierarchical tunnel. Moreover, removing the states of the child tunnels from the intermediate nodes reduces the number of child tunnels in portions of the network (i.e., where the intermediate nodes are, such as, e.g., a network core, etc.), and releases bandwidth reserved on those nodes for the child tunnels.

In one embodiment, the head-end node of the hierarchical tunnel allows the tail-end node to continue any necessary propagation of refresh messages along the child tunnel by updating the ERO contained within each groomed child tunnel's Path message 300 to remove the intermediate nodes of the hierarchical tunnel (e.g., router E), and then label switching (encapsulating) the message onto the hierarchical tunnel. In this way, the next hop node of the ERO sent from the head-end node becomes the tail-end node (e.g., router F), such that when the tail-end node decapsulates the encapsulated Path message for the child tunnel, it sees itself as the next hop, and continues to forward the refresh (Path) message along the child tunnel in a conventional manner. Otherwise, the tail-end node would decapsulate the message to find an intermediate node as the next-hop node, and would send an error message in response.

Notably, the refresh message sent along the child tunnel and the encapsulated refresh message(s) within the hierarchical tunnel may or may not be sent substantially simultaneously. For instance, it may be beneficial to maintain a specific order/sequence when grooming (e.g., establishing, refreshing, and tearing down) tunnels. In particular, as mentioned above, the hierarchical tunnel takes into account the bandwidth requirement of the child tunnel. However, when establishing the hierarchical tunnel, the bandwidth may not be available due to the double-booking described above. One manner to ensure available bandwidth, is to tear down the child tunnel at the intermediate nodes prior to establishing the hierarchical tunnel. Unfortunately, during the time between the tearing down of the child tunnel and the establishment of the hierarchical tunnel, traffic of the child tunnel may be lost. Alternatively, then, one embodiment maintains the state of the child tunnel temporarily at the intermediate nodes, while removing the reserved band-width at the intermediate nodes prior to establishment of the hierarchical tunnel. Once the hierarchical tunnel is established, then the states of the child tunnels may be torn down. In addition, to alleviate some signaling involved with this, another embodiment utilizes a similar GROOM-OP field 500, but now requests that the intermediate nodes remove the reserve bandwidth for the child tunnels substantially immediately, while indicating a tear-down timer that, when exhausted, signifies when the child tunnel should be torn down (e.g., allowing the head-end node time to establish the hierarchical tunnel with adequate bandwidth). Those skilled in the art will appreciate that the order/timing of the actions described herein may be applied in different manners to obtain different results, each within the spirit and scope of the present invention.

Optionally, a message may be sent from either the hierarchical tunnel head-end node (router D), the tail-end node (router F), or any one of the intermediate nodes (router E) to the child tunnel head-end node (e.g., router A of cLSP 1) informing the child tunnel head-end node that the child tunnel has been groomed successfully (or, notably, that a failure has occurred). As described herein, because the grooming operation does not require the child tunnel head-end node, this message/signal may be used for, e.g., management purposes, etc., as will be understood by those skilled in the art. Further, an optional indication (e.g., flag 335 of LSP-ATTRIBUTE 330) may be initially used by the child tunnel head-end node (e.g., during child tunnel establishment) to indicate that the child tunnel should not be groomed, e.g., for various reasons.

Figure 7:
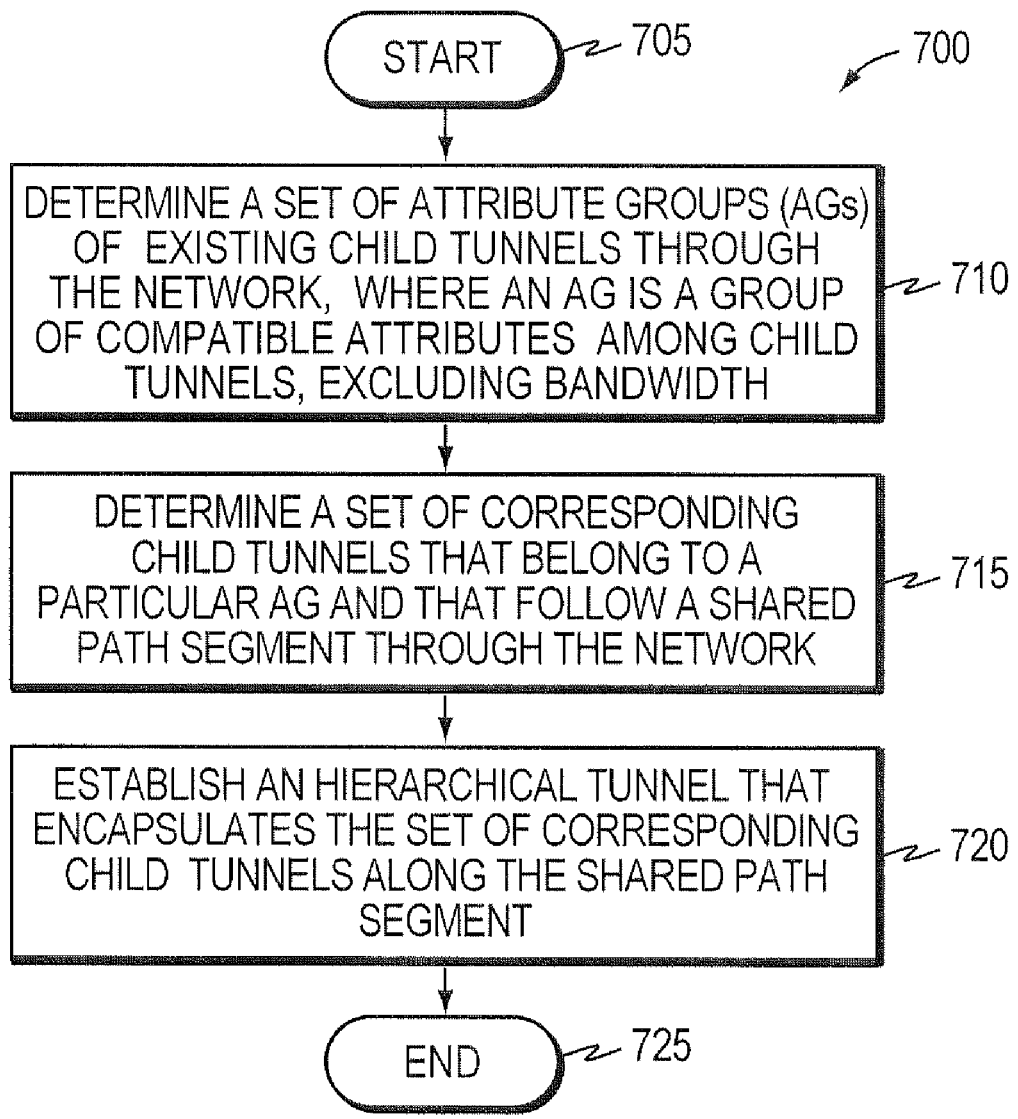
FIG. 7 is a flowchart illustrating an example procedure for dynamically and efficiently forming hierarchical tunnels in accordance with one or more embodiments described herein.

FIG. 7 is a flowchart illustrating an example procedure for dynamically and efficiently forming hierarchical tunnels in accordance with one or more embodiments described herein. The procedure 700 starts at step 705, and continues to step 710, where a node (e.g., a grooming node such as router D) determines a set of attribute groups (AGs) (e.g., AG-X, AG-Y, AG-Z, etc.) of existing child tunnels (e.g., child tunnels 1-3, etc.) through the network 100, as described above. In step 715, the node determines a set of corresponding child tunnels that belong to a particular AG and that follow a shared path segment through the network (e.g., child tunnels 1-2 of AG-X). In step 720, the node establishes an hierarchical tunnel (e.g., hLSP 1) that encapsulates the set of corresponding child tunnels along the shared path segment. Notably, as described above, the node may also first determine whether the set of child tunnels is large enough as well as whether the hierarchical tunnel is long enough to merit encapsulation aggregation prior to establishing the hierarchical tunnel. The procedure 700 then ends in step 725.

Figure 8:
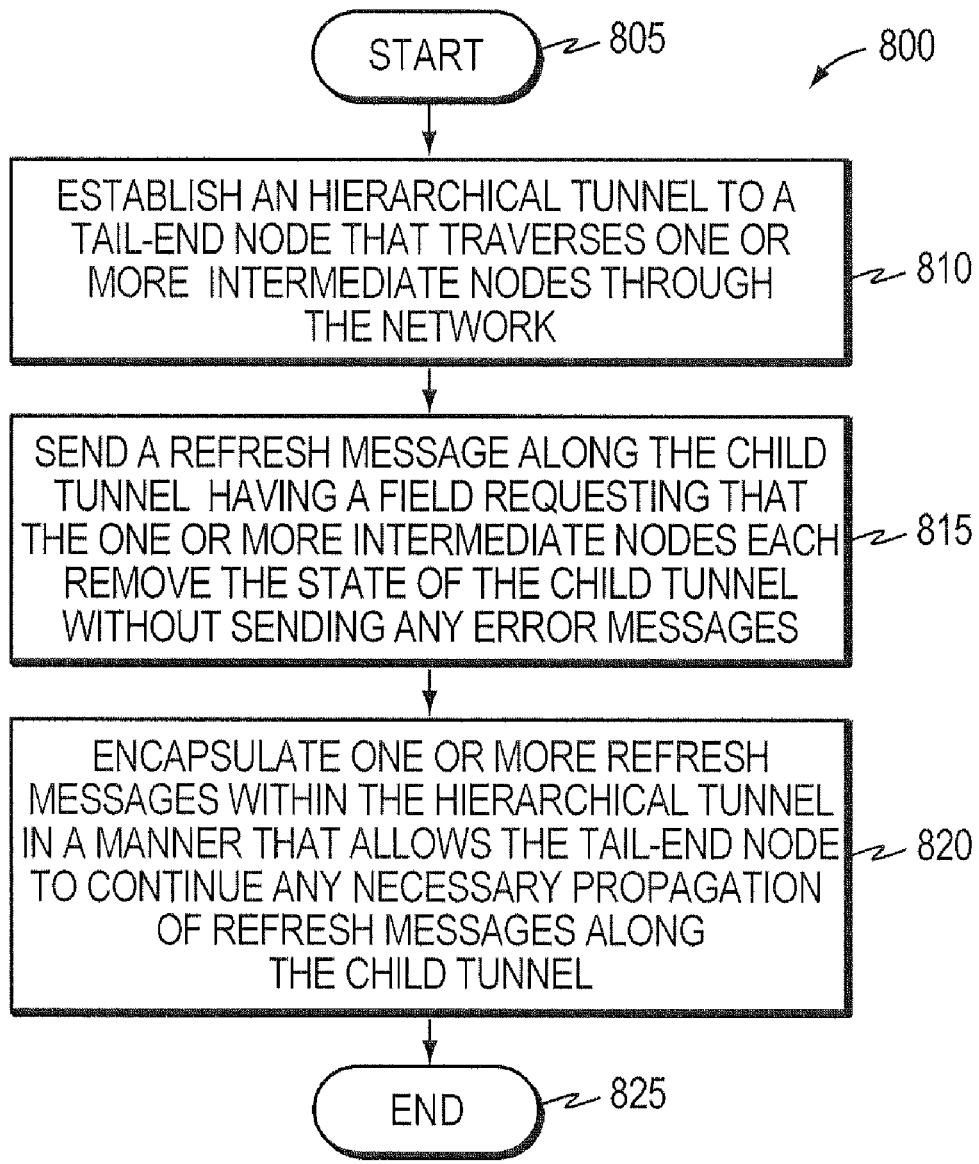
FIG. 8 is a flowchart illustrating an example procedure for dynamically and efficiently forming hierarchical tunnels in accordance with one or more embodiments described herein.

FIG. 8 is a flowchart illustrating an example procedure for dynamically and efficiently forming hierarchical tunnels in accordance with one or more embodiments described herein. The procedure 800 starts at step 805, and continues to step 810, where a node (e.g., head-end node D) establishes an hierarchical tunnel (e.g., hLSP 1) to a tail-end node (e.g., router F) that traverses one or more intermediate nodes (e.g., router E) through the network, such as in accordance with FIG. 7 above. The node refreshes a state of a child tunnel (e.g., cLSP 1) encapsulated within the hierarchical tunnel by i) sending, in step 815, a refresh message (e.g., Path message) 300 along the child tunnel having a field (e.g., GROOM-OP field) 500 requesting that the one or more intermediate nodes each remove the state of the child tunnel without sending any error messages (e.g., PathErr messages), and ii) encapsulating, in step 820, one or more refresh messages 300 within the hierarchical tunnel in a manner that allows the tail-end node F to continue any necessary propagation of refresh messages 300 along the child tunnel. As described above, this may be achieved by reconfiguring the ERO of the Path message 300 to remove the intermediate node(s) (e.g., router E), such that the tail-end node (e.g., router F) is the next hop node upon decapsulation of the message 300. The head-end node may continue to refresh the child tunnels in this manner as necessary, until the procedure 800 ends in step 825 (e.g., until the child or hierarchical tunnel is torn down, etc., as will be understood by those skilled in the art).

Advantageously, the novel technique dynamically and efficiently forms hierarchical tunnels in a computer network. By dynamically creating hierarchical tunnels, the novel technique alleviates the need for cumbersome manual configuration and reduces the number of tunnels in portions of the network. In particular, the novel technique allows for efficient aggregation of child tunnels as needed and for solutions to various challenges presented therewith, such as refreshing the states of the child tunnels. Also, the present invention does not require undue (or substantially any) extra participation by the head-end node of the child tunnel.

While there have been shown and described illustrative embodiments that dynamically and efficiently form hierarchical tunnels in a computer network, it is to be understood that various other adaptations and modifications may be made within the spirit and scope of the present invention. For example, the disclosure has been shown and described herein with/using MPLS TE-LSPs. However, the embodiments of the invention in its broader sense are not so limited, and may, in fact, be used with any appropriate tunneling/encapsulation mechanism, such as IP Security (IPSec) tunnels, Point-to-Point Protocol (PPP) tunnels, Layer-2 Tunneling Protocol (L2TP) tunnels, etc., as will be understood by those skilled in the art. Also, while the above description describes utilizing RSVP messages, those skilled in the art will understand that other reservation protocols may also be used.

Notably, the present invention may also be used with multiple levels of hierarchy, such that a plurality of hierarchical tunnels may be groomed into another single hierarchical tunnel, etc.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
using a hierarchical tunnel that encapsulates a plurality of child tunnels along a shared path segment, the shared path segment extending from a head-end node across one or more intermediate nodes to a tail-end node; and
refreshing a state of a child tunnel of the plurality of child tunnels encapsulated within the hierarchical tunnel by
sending, by the head-end node, one or more refresh messages along the child tunnel that include a request that the one or more intermediate nodes remove the state of the child tunnel without sending error messages, and
sending, by the head-end node, one or more encapsulated refresh messages within the hierarchical tunnel that cause the tail-end node to continue propagation of refresh messages along the child tunnel.

2. The method of claim 1, wherein the request causes resources used by the child tunnel to be freed at the one or more intermediate nodes.

3. The method of claim 1, wherein the one or more refresh messages are one or more Resource ReSerVation Protocol (RSVP) Path messages and the error messages are RSVP PathErr or PathTear messages.

4. The method of claim 3, wherein the request is embodied as an extension object field of the one or more RSVP Path messages.

5. The method of claim 1, wherein the one or more encapsulated refresh messages include a hop-by-hop path of the child tunnel with the one or more intermediate nodes removed such that the tail-end node appears as a next hop.

6. The method of claim 5, wherein the one or more encapsulated refresh messages are one or more ReSerVation Protocol (RSVP) Path messages and the hop-by-hop path is an explicit route object (ERO) contained in the one or more RSVP Path messages.

7. The method of claim 1, wherein the one or more refresh messages and the one or more encapsulated refresh messages are sent simultaneously.

8. The method of claim 1, wherein the request indicates the removal of the state of the child tunnel should be delayed such that the state is not removed until the hierarchical tunnel is established.

9. The method of claim 1, wherein the using further comprises establishing the hierarchical tunnel by:
   determining a set of attribute groups (AGs) of tunnels, wherein an AG is a group of compatible attributes among tunnels;
   determining a set of tunnels that belong to a particular AG and that follow the shared path segment; and
   using the set of tunnels as the plurality of child tunnels.

10. The method of claim 1, wherein the head-end node comprises one or more network interfaces, one or more processors and a memory.

11. An apparatus, comprising:
   one or more network interfaces coupled to child tunnels, the child tunnels encapsulated by a hierarchical tunnel along a shared path segment that extends from the apparatus across one or more intermediate nodes to a tail-end node;
   one or more processors coupled to the one or more network interfaces and configured to execute one or more software processes; and
   a memory configured to store a software process executable by each processor, the software process configured, when executed, to:
      send one or more refresh messages along the child tunnel that include a request that the one or more intermediate nodes remove the state of the child tunnel without sending error messages, and
      send one or more encapsulated refresh messages within the hierarchical tunnel that cause the tail-end node to continue propagation of refresh messages along the child tunnel.

12. The apparatus of claim 11, wherein the request causes resources used by the child tunnel to be freed at the one or more intermediate nodes.

13. The apparatus of claim 11, wherein the one or more refresh messages are one or more Resource ReSerVation Protocol (RSVP) Path messages and the error messages are RSVP PathErr or PathTear messages.

14. The apparatus of claim 13, wherein the request is embodied as an extension object field of the one or more RSVP Path messages.

15. The apparatus of claim 11, wherein the one or more encapsulated refresh messages include a hop-by-hop path of the child tunnel with the one or more intermediate nodes removed such that the tail-end node appears as a next hop.

16. The apparatus of claim 15, wherein the one or more encapsulated refresh messages are one or more ReSerVation Protocol (RSVP) Path messages and the hop-by-hop path is an explicit route object (ERO) contained in the one or more RSVP Path messages.

17. The apparatus of claim 11, wherein the software processes are further configured, when executed, to send the one or more refresh messages and the one or more encapsulated refresh messages simultaneously.

18. The apparatus of claim 11, wherein the request indicates the removal of the state of the child tunnel should be delayed such that the state is not removed until the hierarchical tunnel is established.

19. The apparatus of claim 11, wherein the software processes are further configured, when executed, to:
   determine a set of attribute groups (AGs) of tunnels, wherein an AG is a group of compatible attributes among tunnels,
   determine a set of tunnels that belong to a particular AG and that follow the shared path segment, and
   use the set of tunnels as the plurality of child tunnels.

20. One or more non-transitory computer-readable media encoded with software that when executed is operable to:
   use a hierarchical tunnel that encapsulates a plurality of child tunnels along a shared path segment, the shared path segment extending from a head-end node across one or more intermediate nodes to a tail-end node; and
   refresh a state of a child tunnel of the plurality of child tunnels encapsulated within the hierarchical tunnel by
      transmission of one or more refresh messages along the child tunnel that include a request that the one or more intermediate nodes remove the state of the child tunnel without sending error messages, and
      transmission of one or more encapsulated refresh messages within the hierarchical tunnel that cause the tail-end node to continue propagation of refresh messages along the child tunnel.

* * * * *

UNITED STATES PATENT AND TRADEMARK OFFICE
CERTIFICATE OF CORRECTION

PATENT NO. : 8,363,571 B2  
APPLICATION NO. : 13/433011  
DATED : January 29, 2013  
INVENTOR(S) : Jean-Philippe Vasseur et al.

Page 1 of 1

It is certified that error appears in the above-identified patent and that said Letters Patent is hereby corrected as shown below:

In the Specification

In col. 8, line 18 should read:  
certain set of ~~is~~ compatible attributes that is "shared" among In col. 10, line 58 should read:  
removing the reserved ~~band-width~~ bandwidth at the intermediate nodes Signed and Sealed this  
Twenty-fifth Day of June, 2013

Teresa Stanek Rea  
*Acting Director of the United States Patent and Trademark Office*